United States Patent [19]
Ernst

[11] 3,927,738
[45] Dec. 23, 1975

[54] LOAD DEPENDENT ACTING BRAKE FOR CONVEYOR DEVICES

[75] Inventor: Werner Ernst, Rotkreuz, Switzerland

[73] Assignee: Inventio Aktiengesellschaft, Hergiswil, Switzerland

[22] Filed: Oct. 29, 1974

[21] Appl. No.: 518,604

[30] Foreign Application Priority Data
Nov. 2, 1973 Switzerland.................. 15493/73

[52] U.S. Cl. ............................... 188/187; 188/170
[51] Int. Cl.² .......................................... B60T 8/16
[58] Field of Search ........... 188/2 A, 110, 170, 180, 188/181, 187

[56] References Cited
UNITED STATES PATENTS

| | | | |
|---|---|---|---|
| 1,988,986 | 1/1935 | Sterns .......................... | 188/181 A |
| 2,012,366 | 8/1935 | Wevers ......................... | 188/181 A |
| 2,196,434 | 4/1940 | Allstrom ...................... | 188/187 UX |
| 3,326,333 | 6/1967 | Rockwell ..................... | 188/181 A |

Primary Examiner—Duane A. Reger
Attorney, Agent, or Firm—Werner W. Kleeman

[57] ABSTRACT

A load dependent acting brake arrangement for conveyor devices composed of a brake disk secured to a drive shaft of the conveyor device, at least one brake jaw mounted at brake lever means and capable of being pressed under the action of brake spring means at the brake disk, said brake jaw being connected via a brake rod with a brake vent device, wherein in the switched-in state for venting the brake a pneumatic force opposing the force direction of the brake spring means is exerted upon the brake lever means and in the switched-off state the brake lever means is pressed by the brake spring means into the brake closing position. A mechanically acting deceleration feeler device is effective at the brake lever means and an adjustment lever acts via a prestressed spring at the brake rod and which adjustment lever moves through a path proportional to the deceleration occurring at the drive shaft of the conveyor device in the sense of reducing the braking force exerted by the brake jaw upon the brake disk.

2 Claims, 2 Drawing Figures

LOAD DEPENDENT ACTING BRAKE FOR CONVEYOR DEVICES

BACKGROUND OF THE INVENTION

The present invention relates to a load dependent acting brake for conveyor devices and the like comprising a brake disk secured to a drive shaft of the conveyor device, at least one brake jaw mounted at brake levers and which can be pressed under the action of brake springs against the brake disk. The brake jaw is connected via a brake rod with a conventional brake vent device which in its switched-on state for venting the brake exerts a pneumatic force upon the brake lever and opposite the direction of the force of the brake springs and in the switched-off state is pressed by the brake springs into the brake closing position.

Conveyor devices such as for instance passenger conveyor belts, escalators and the like generally possess an operating brake having a fixed adjusted brake moment. Especially in the case of long conveyor bands and escalators where there occur large load differencies between the non-loaded and the fully loaded operation condition there result during braking with constant brake moment for different operating conditions completely different brake decelerations and brake paths, which is the case of inclined conveyors such as, for instance, escalators additionally are dependent upon the direction of travel. Now however, since the longest brake path for rendering possible an effective emergency braking operation must not exceed a certain length it is necessary to adjust at the brake a relatively large braking moment. This leads to the fact that when braking small loads there occur very large brake decelerations which under certain circumstances can lead to a throwing-off or sliding away of loads and especially in the case of passenger conveyor belts and escalators to falling and injury of the passengers.

It has already been proposed for obtaining a load-independent constant braking deceleration to provide an operating brake with a braking moment which varies as a function of the load.

With a known brake of such type the braking moment of the operating brake is altered in an electromechanical manner with the aid of electronic regulating circuits. Such brake systems, however, are very complicated and expensive and especially in the case of power failure, which constitutes the most frequent cause for placing into operation the brake when the conveyor device is loaded, do not fulfill the requisite safety requirements as a general rule since normally they require a current circuit which is closed during the braking operation and generally is not permissible.

Another prior art load-dependent acting braking device works with two brakes and a load measuring switch. The first brake generates the braking force or effort when the excitation is turned-off, whereas the second brake, depending upon the position of the load measuring switch, in the excited state produces two different braking moments. This braking device brings about a continuous accommodation of the braking moment to the momentary load condition. In the case of power failure there is not produced any load dependent braking moment.

There is also known to the art a braking device composed of a primary brake with fixed brake moment and a secondary brake with variable brake moment, wherein the rotatable brake part of the primary brake is rigidly connected with the fixed brake part of the secondary brake. The brake part of the secondary brake which rotates with the drive shaft of the conveyor device consists of a carrier disk or support disk secured to the drive shaft and a pressure disk displaceably mounted upon a projection of the carrier disk, between which there is fixedly clamped under the action of brake springs the brake disc constituting the fixed brake part of the secondary brake. Mounted on the carrier disk is a rod which on the one hand is pressed against an adjustment curve or cam under spring pressure and which cam is arranged at a flywheel mounted to be freely rotatable at the drive shaft and on the other hands acts upon the pressure disk in the sense of changing the clamping force of the brake. The adjustment cam is designed such that with an angular displacement between the drive shaft and the flywheel — and which angular displacement arises during speed changes of the conveyor device — the clamping force of the secondary brake is changed via the rod proportional to such angular displacement.

With this brake device for realizing a constant directional-independent braking deceleration there can be produced a continuous braking moment accommodated to the momentary load condition. It is also effective in the case of power failure. The brake device is however very expensive and complicated. Furthermore difficulties arise during readjustment of the secondary brake which is required upon wear of the brake lining, since the oppositely acting forces must be accommodated to one another.

SUMMARY OF THE INVENTION

It is a primary object of the present invention to improve upon the last-mentioned brake system of the prior art such that the expenditure is smaller and the brake readjustment required upon wear of the lining of the brake is simplified.

Now in order to implement this object and others which will become more readily apparent as the description proceeds, it is contemplated that there is brought into action at the brake lever a conventional mechanically operating deceleration feeler device, and that an adjustment lever acting via a pre-stressed spring upon the brake rod is moved through a path proportional to the deceleration occurring at the drive shaft of the conveyer device, in the sense of reducing the braking force exerted by the brake jaws upon the brake disk.

BRIEF DESCRIPTION OF THE DRAWING

The invention will be better understood and objects other than those set forth above, will become apparent when consideration is given to the following detailed description thereof. Such description makes reference to the annexed drawing wherein.

DETAILED DESCRIPTION OF THE PREFERRED EMBODIMENT

Figure 1:
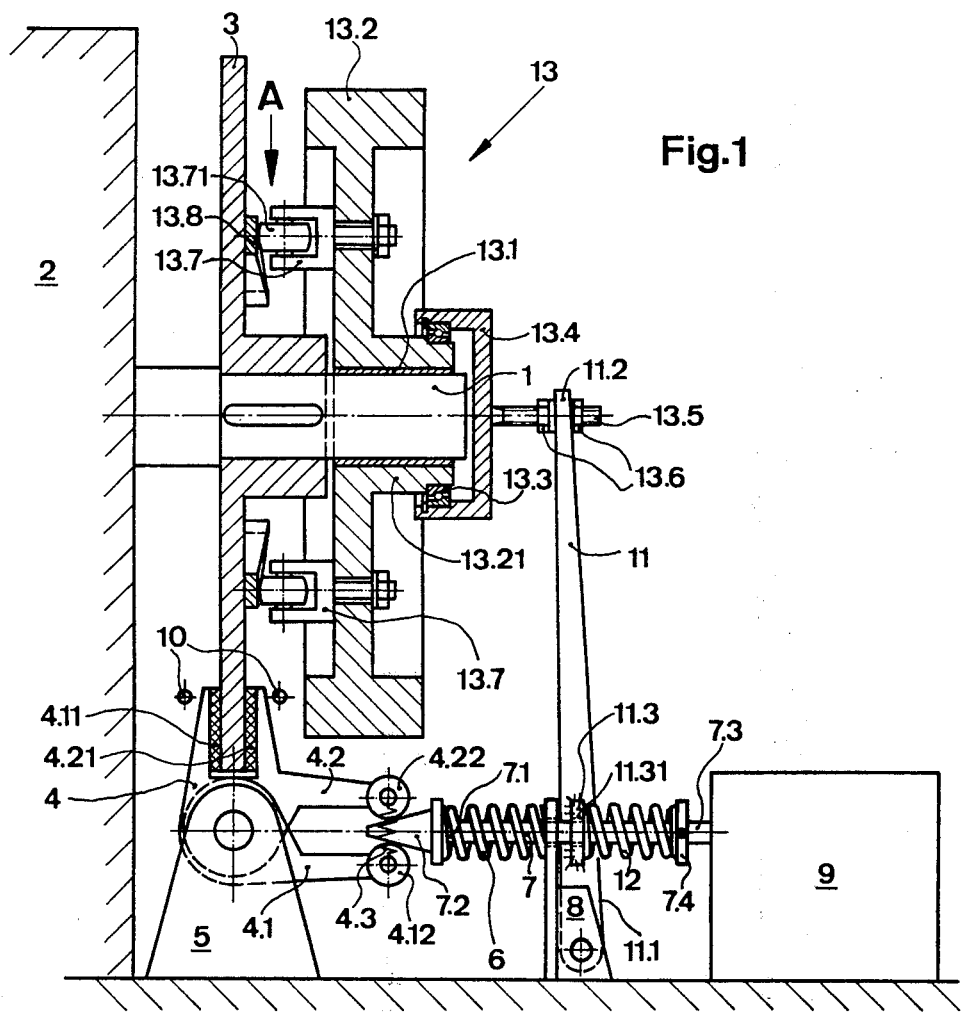
FIG. 1 is a sectional view through an inventive load dependent acting brake.

Describing now the drawing reference numeral 1 in FIG. 1 designates the drive shaft of a drive machine 2 which drives a conventional and therefore not particularly illustrated conveyor device or installation, such as for instance escalators, passenger conveyor belt or the like. Keyed to this drive shaft 1 is a brake disk 3 which is embedded at its periphery between two brake jaws 4.11, 4.21 mounted in or at brake levers 4 and equipped with brake linings. In this exemplary embodiment the brake levers 4 are constructed as brake clamps and consist of two clamp levers 4.1, 4.2 rotatably mounted in a bearing block 5, and at their actuation sides there are rotatably mounted oppositely situated rollers 4.12, 4.22. The actuation sides of the clamp levers 4.1, 4.2 are connected with one another by a tension spring 4.3 which strives to draw both rollers 4.12, 4.22 towards one another and to open the brake levers or clamps 4 and to lift the brake jaws 4.11, 4.21 from the brake disk 3. For the purpose of closing the brake levers or clamps 4 a brake wedge 7.2 secured at one end 7.1 of a brake rod 7 is shifted under the action of a brake spring 6 between the rollers 4.12, 4.22. The brake rod 7 is guided in a fixed bearing or mounting 8 and engages with other end 7.3 into a brake vent or venting device 9 of conventional structure. The brake spring 6 bears at one end at the brake wedge 7.2 and at the other end at the fixed bearing or support 8. The opening path or distance of the brake jaws 4.11, 4.21 is limited by the stops 10.

In the fixed bearing or support 8 an adjustment lever 11 is pivotably mounted with its one end 11.1. A projection 11.3 is secured at the adjustment lever between its two ends 11.1, 11.2 at the region of the brake rod 7 intermediate the fixed bearing 8 and the brake vent device 9. This projection 11.3 possesses a throughpassage hole or bore 11.31 through which there is guided the brake rod 7. A pre-biased or pre-stressed pressure spring 12 bears at one end at this projection 11.3 and at the other end at a disk 7.4 secured at the brake rod 7 between the projection 11.3 and the brake vent device 9 and exerts a rotational moment upon the adjustment lever 11. At the end 11.2 of the adjustment lever 11 there engages a deceleration feeler device 13.

The deceleration feeler device 13 consists of a flywheel 13.2 which is mounted by means of a sliding bearing 13.1 to be freely movable and axially displaceable at the end of the drive shaft 1. At a hub 13.21 of the flywheel 13.2 and which hub is extended towards the end of the drive shaft 1 there is mounted by means of a ball bearing 13.3 a pressure hood 13.4 which does not rotate along with the flywheel 13.2. At the pressure hood 13.4 there is attached a threaded bolt 13.5 which is guided through a throughpassage hole at the end 11.2 of the adjustment lever 11. Nut members 13.6 are arranged at the threaded bolt 13.5 to both sides of the adjustment lever 11. In the flywheel 13.2 there are secured at the side of the brake disk 3 two diametrically oppositely situated roller bearings 13.7 in which there are mounted pressure rollers 13.71. These pressure rollers 13.71 are pressed with a force against the adjustment curves or cams 13.8 arranged at the brake disk 3 and which force is exerted by the pressure spring 12 via the adjustement lever 11, the threaded bolt 13.5, the pressure hood 13.4, the ball bearing 13.3 and the flywheel 13.2. As can be seen from FIG. 2 the arched or curved adjustment cams or curves 13.8 when looking in front view possess the profile of two wedges pushed towards one another with the tips. Since the fly-wheel 13.2 is mounted to be freely rotatable and displaceable upon the drive shaft 1, when the drive machine 2 is at standstill, then the rollers 13.71 under the action of the force exerted by the pressure spring 12 are located at the lowermost position or location of the adjustment cams 13.8.

Figure 2:
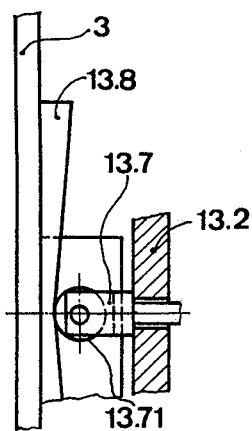
FIG. 2 is a view according to the arrow A of FIG. 1 of an adjustment curve or cam.

The load dependent acting brake according to FIGS. 1 and 2 functions as follows:

Upon starting up the conveyor device the air vent device 9 opens the brake lever or clamps 4 by retracting the brake wedge 7.2 by means of the brake rod 7, so that the brake jaws 4.11, 4.21 are raised or lifted off the brake disk 3. The brake disk 3 is placed into an accelerated rotational movement by the drive shaft 1 with the result that it entrains the flywheel 13.2 through the agency of the rollers 13.71 which are pressed against the adjustment cams 13.8 of the brake disk due to the prestressed forces of the spring 12. Above a certain acceleration of the brake disk 3 there prevails a rotation between it and the flywheel 13.2 which however is without any effect. After reaching the constant operating rotational speed this displacement again balances out, so that the brake disk 3 and the flywheel 13.2 again rotate in synchronism and the rollers 13.71 again come to lie at the lowest point of the adjustment cams or curves 13.8.

Upon braking the conveyor device the brake vent device 9 is switched-off or opens, so that the brake wedge 7.2 under the action of the brake spring 6 is pushed between the rollers 4.12, 4.22 and thus the brake jaws 4.11, 4.21 are pressed against the brake disk 3. Depending upon the magnitude of the load there thus prevails at the drive shaft 1 a certain deceleration. If such deceleration exceeds a certain value, then the rotational moment generated at the flywheel becomes larger than the retaining or back-hold moment defined by the prestress of the pressure or compression spring 12 and the inclination or pitch of the adjustment curves 13.8 and the flywheel 13.2 rotates relative to the brake disk 3. This rotation relative to the brake disk 3, owing to the wedge shape of the adjustment curves or cams 13.8, brings about an axial displacement of the flywheel 13,2 which causes a rocking of the adjustment lever 11 against the rotational moment exerted on it by the pressure spring 12. The adjustment lever stop 11.3 is displaced through a distance proportional to the occurring deceleration and thus via the pressure spring 12, the disk 7.4 and the brake rod 7 brings about a reduction of the braking force or effort exerted by the brake jaws 4.11, 4.21 upon the brake disk 3. The braking moment is thus continuously influenced as a function of the load, so that with proper accommodation or synchronisation there results a constant, directional independent deceleration of the conveying device when it is brought to standstill.

The inventive load dependent acting brake can be realised with the slightest expenditure. The readjustment upon wear of the brake linings occurs by displacing the adjustment lever 11 at the threaded bolt 13.5 by means of the nut members or nuts 13.6. Furthermore over wide limits during wear of the lining no readjustment is necessary, since with the adjusted longer spring path of the brake spring 6 the spring path of the pressure spring 12 is shortened and therefore with the adjusted smaller primary braking moment there results a displacement acting as compensation for such brake deceleration value at which the flywheel 13.2 begins to axially displace. The invention can be utilized with most of the known brake systems, wherein modifications within the skill of those versed in the art might be necessary. For instance, instead of the disk brake illustrated in the exemplary embodiment it would be readily possible to use inner- and outer brake jaws or band brakes. Also it is possible to employ instead of the illustrated flywheel-deceleration feeler device another known deceleration measuring device.

While there is shown and described present preferred embodiments of the invention, it is to be distinctly understood that the invention is not limited thereto, but may be otherwise variously embodied and practiced within the scope of the following claims. Accordingly,

What is claimed is:

1. A load dependent acting brake for a conveyor device, comprising a drive shaft provided for the conveyor device, a brake disk secured to said drive shaft of said conveyor device, brake lever means cooperating with said brake disk, at least one brake jaw mounted at said brake lever means, said brake jaw including a brake clamp, a brake rod cooperating with said brake lever means, a fixed bearing in which the brake rod is displaceably guided, a brake wedge secured to an end of the brake rod, brake spring means operatively engaging at the brake wedge and bearing against said fixed bearing, said brake spring means exerting a force upon said brake wedge secured to the brake rod for pressing said brake jaw against said brake disk, a brake vent device operatively connected with said brake rod, said brake jaw being in operative co-action by means of said brake rod with said brake vent device, said brake vent device in its switched-in state for venting the brake retracting the brake rod against the action of said brake spring means and said brake vent device in its switched-off state pressing the brake lever means and said brake jaw through the action of the force applied by the brake spring means upon the brake wedge of the brake rod into a brake closing position, a mechanically acting deceleration feeler device effective at the brake lever means, an adjustment lever rotatably mounted at the fixed bearing and cooperating with said brake rod, a disk secured to said brake rod, a prestressed pressure spring disposed between the fixed bearing and the brake vent device, said prestressed pressure spring bearing at said disk secured to the brake and exerting a force upon the adjustment lever, said adjustment lever acting by means of said prestressed pressure spring upon said brake rod, said mechanically acting deceleration feeler device cooperating with said adjustment lever in order to move said adjustment lever through a path substantially proportional to the deceleration occuring at the drive shaft of the conveyor device in the sense of reducing the braking force exerted by the brake jaw upon the brake disk.

2. A load dependent acting brake for a conveyor device, comprising a drive shaft provided for the conveyor device, a brake disk secured to said drive shaft of said conveyor device, brake lever means cooperating with said brake disk, at least one brake jaw mounted at said brake lever means, brake spring means for exerting a force upon said brake lever means for pressing said brake jaw against said brake disk, a brake rod cooperating with said brake lever means, a brake vent device operatively connected with said brake rod, said brake jaw being in operative co-action by means of said brake rod with said brake vent device, said brake vent device in its switched-in state for venting the brake exerting a pneumatic force upon the brake lever means by means of the brake rod which opposes the direction of the force applied by said brake spring means and said brake vent device in its switched-off state pressing the brake lever means through the action of the force applied by the brake spring means into a brake closing position, a mechanically acting deceleration feeler device effective at said brake lever means, an adjustment lever positioned to cooperate with said mechanically acting deceleration feeler device and said brake rod, a prestressed pressure spring provided for said adjustment lever, said adjustment lever acting by means of said prestressed pressure spring upon said brake rod, said mechanically acting deceleration feeler device comprising a flywheel mounted to be freely movable and axially displaceable at the end of said drive shaft, said flywheel having a hub extending towards said end of the drive shaft, a pressure hood mounted at said hub, said pressure hood actuating the adjustment lever but not rotating along with the flywheel but axially displaceable therewith, at least one pressure roller mounted at the flywheel at a side thereof confronting the brake disk, adjustment cam means arranged at the brake disk and cooperating with said pressure roller, said pressure roller being pressed under the action of the prestress force of the pressure spring transmitted from the adjustment lever to the flywheel against said adjustment cam means and converting rotation of the flywheel and brake disk into an axial displacement of the flywheel, said axial displacement of the flywheel causing said flywheel to act upon said adjustment lever to move said adjustment lever through a path substantially proportional to the deceleration occurring at the drive shaft of the conveyor device in the sense of reducing the braking force exerted by the brake jaw upon the brake disk.

* * * * *